(12) United States Patent
Ricci (10) Patent No.: US 10,650,684 B2
(45) Date of Patent: May 12, 2020

(54) GUIDANCE SYSTEM AND AUTOMATIC CONTROL FOR VEHICLES

(71) Applicant: Francesco Ricci, Santarcangelo di Romagna (IT)

(72) Inventor: Francesco Ricci, Santarcangelo di Romagna (IT)

(*) Notice: Subject to any disclaimer, the term of this patent is extended or adjusted under 35 U.S.C. 154(b) by 103 days.

(21) Appl. No.: 15/551,604

(22) PCT Filed: Feb. 17, 2016

(86) PCT No.: PCT/IB2016/050830
§ 371 (c)(1),
(2) Date: Aug. 17, 2017

(87) PCT Pub. No.: WO2016/132295
PCT Pub. Date: Aug. 25, 2016

(65) Prior Publication Data
US 2018/0047295 A1    Feb. 15, 2018

(30) Foreign Application Priority Data
Feb. 19, 2015    (IT) .............................. RN2015A0006

(51) Int. Cl.
| G08G 5/00 | (2006.01) |
| G08G 5/02 | (2006.01) |
| G05D 1/10 | (2006.01) |
| G01S 19/49 | (2010.01) |
| G01S 5/02 | (2010.01) |
| B64C 39/02 | (2006.01) |
| G05D 1/00 | (2006.01) |

(52) U.S. Cl.
CPC ......... *G08G 5/0034* (2013.01); *B64C 39/024* (2013.01); *G01S 5/02* (2013.01); *G01S 5/0263* (2013.01); *G01S 19/49* (2013.01); *G05D 1/0027* (2013.01); *G05D 1/104* (2013.01); *G08G 5/0013* (2013.01); *G08G 5/0039* (2013.01); *G08G 5/0069* (2013.01); *G08G 5/0082* (2013.01); *B64C 2201/14* (2013.01); *B64C 2201/143* (2013.01)

(58) Field of Classification Search
None
See application file for complete search history.

(56) References Cited

U.S. PATENT DOCUMENTS

| 2009/0125221 A1* | 5/2009 | Estkowski | G05D 1/104 701/120 |
| 2014/0018979 A1* | 1/2014 | Goossen | G08G 5/0034 701/3 |
| 2014/0032034 A1* | 1/2014 | Raptopoulos | G08G 5/0069 701/25 |

OTHER PUBLICATIONS

Search report of PCT/IB2016/050830 dated Jun. 16, 2016.

* cited by examiner

*Primary Examiner* — Adam D Tissot
(74) *Attorney, Agent, or Firm* — Patterson Intellectual Property Law. P.C.; Gary L. Montle

(57) ABSTRACT

The present invention relates to a system and a method to guide and manage vehicles. These operations in total or partial absence of human intervention. The system developed through mobile radio systems appropriately specialized that oversee the operations with some appropriate control and safety features.

23 Claims, 10 Drawing Sheets

E0 provides the dynamic routing of the flight plans at the request of mobile telephone providers
G-X The mobile telephone provider, supplies the script / NOTAM as prepared by E0, to the user
U-X as user of the transport service and delivery, installs the script / NOTAM on the SAPR chosen to perform the mission

1001: Hold position during transportation
1002: Hold position during the drain
1003: Introduction envelope / goods inside chute
1004: switch completely closed
1005: switch completely open
1006: Envelope delivering
1007: Completion message for the delivery

GUIDANCE SYSTEM AND AUTOMATIC CONTROL FOR VEHICLES

SCOPE OF THE INVENTION

Figure 1:
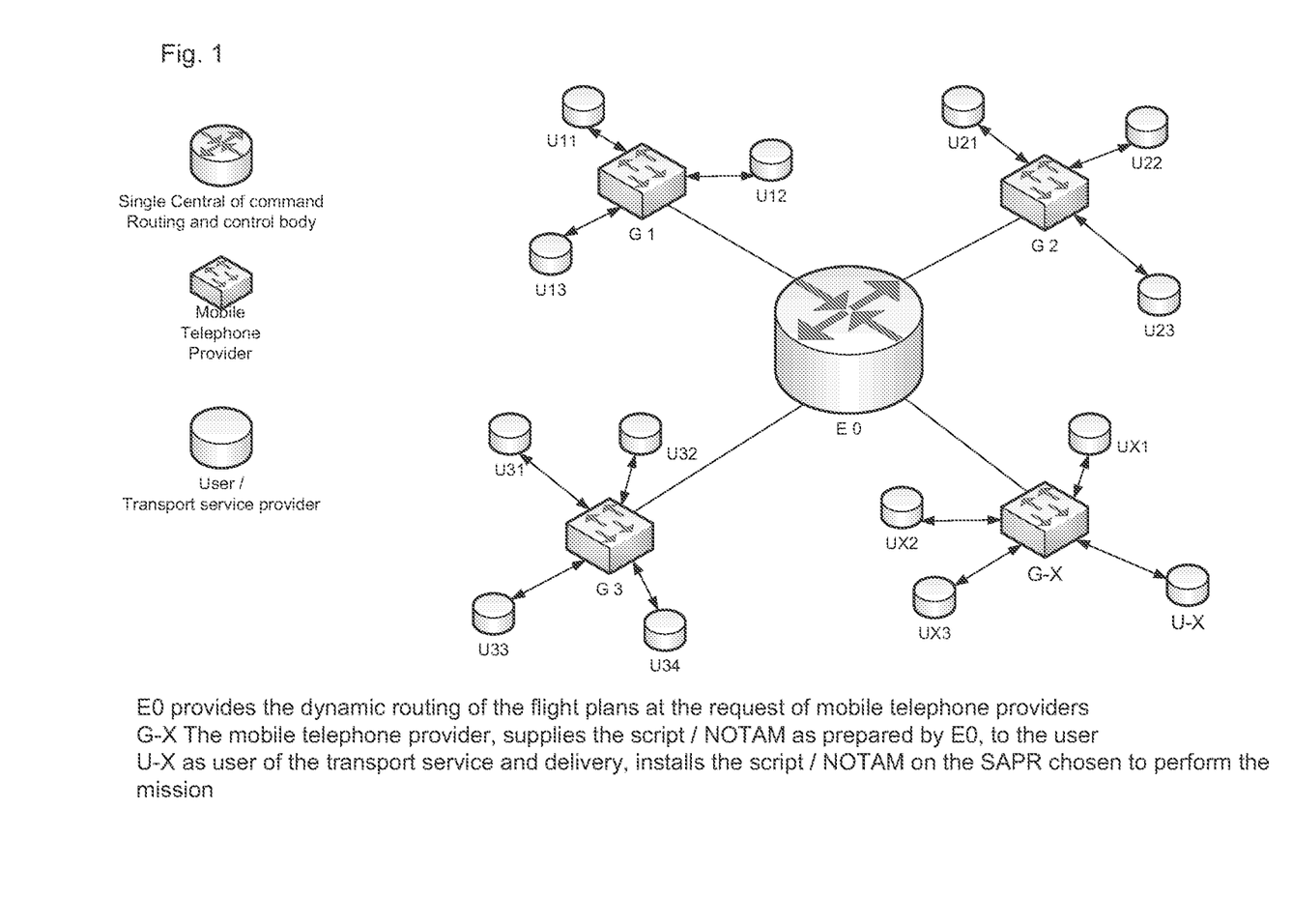

In the various and disparate fields (aerospace, automotive, rail, . . . ) there is a continuous search for solutions that allow the guidance from remote with total or partial absence of human intervention. Daily, means of transport (cars, buses, trains, planes) are used to meet mobility needs for people and goods. For their government the above means use increasingly automated systems. Now, for specific uses of a commercial nature and with the advent of ever more efficient technologies available to the general public it will be possible the utilization of aircraft, drones for these scopes. These vehicles are driven and controlled with radio devices, sensors and specialized software. The algorithms that have been prepared for this purpose provide the guidance using a remote control via joystick systems, at a safe distance. Alternatively, via GPS and/or through networks of Wi-Fi hotspots, these guidance and control systems are driven through readings of geographical sequences. In this case, as not anticipatory matter, is made reference to the patent application: US2014/0277854 A1 to US2014/0254896 A1 to EP253775 A1 and WO2014/080387 A2 that describe the use of such systems with the vehicles in various situations on the ground and up in the air. These systems even if perfected are not well suited for use global and systemic, since each of these vehicles, acts and moves independently from the others. By the increase of vehicles, it is easy to understand that this independence may create, inside a commercial wider scenario, an endemic anarchy that could lead to in a serious lowering of the level of security. The guidance by an operator of these vehicles guarantees immediacy of intervention such as not to lower the degree of safety. Because the aircrafts are not coordinated between them in the air space, in this scenario it is not possible ensure systems safe at 100% as there isn't the possibility to manage a priori driving and destination programs. In this case, if on one hand the driving of automobiles by remote in an automated environment still seems to be far from becoming and consolidate on the market, there is already a practical use in the field of aircraft both military and commercial. Every day we hear of raids or combat missions using drones or you hear of companies that perform surveying, photographic or video surveillance. These missions all have one thing in common, they have the characteristic to be episodic and for this reason are managed tactically from time to time by the human operator of the system that should take agreement, according to needs, with the authorities about its flight plan. It is evident that these operators act independently of each other and for this reason the applicant believes there is a need for a planned management unitary and organized that it would allow a wide, safe and practical commercial use. Therefore, the present invention suggests creating a new system that governs, appropriately, human or automatic guidance systems, through a particular method of guidance and centralized control. This with the specific purpose of being able to manage an automated routing for quantity uprights of vehicles. A system where the aircrafts can find promptly, constantly information, and guide instruction. FIG. 1 represents the general scenario of the service, in a schematic way. In this case, the authorities, mobile telephone operators, service operators who are involved as actors and partners of the structural project.

BRIEF DESCRIPTION OF FIGURES

FIG. 1—General scenario with the central control entity in connection with, the mobile telephone providers and subsequently with the managers of the shipping service FIG. 2—General scenario of the mobile telephone provider in connection with users who apply for script/NOTAM to be installed on the SAPR, for the execution of the service FIG. 3—General scenario of a SAPR that moves in its own corridor for the execution of the mission constantly controlled through the wireless telephone network and satellite FIG. 4—Block diagram concerning the functions and operations of the mobile telephone provider for the request of the script/NOTAM and the relative sending FIG. 5—Block diagram about the functions and operations that the mobile telephone provider verifies over the correctness of the script/NOTAM assigned to the user FIG. 6—Profiling Web Page that has to be completed by the user for: script/NOTAM requests, payment for the transport/flying license, sending links for downloading of the script/NOTAM on SAPR FIG. 7—General representation, section detail, dimensional occupations of the transport corridors and emergency by an aircraft SAPR FIG. 8—Block diagram of the functions executed by the SAPR for performing a flight mission with return to base and relative reloading operations FIG. 9—Block diagram of the operations performed, on the ground, by the mobile telephone provider about the compliance with the script/NOTAM of the SAPR FIG. 10—General view of a drone during the parking operation over a stall, for the unloading operations

BRIEF DESCRIPTION OF THE INVENTION

Through a centralized system, the invention creates a guidance system that manages vehicles even in adverse environmental conditions or in congested areas. The transport service provider makes a prior request/communication to the system that oversees control and the guide of the SAPR in order to obtain a travel route/a delivery. In this phase, the transport service provider communicates departure place, destination, date, and the desired time for the completion of the delivery. The control system verifies the same request and evaluates if the path shows incompatibilities with other previous travel requests/paths.

Figure 2:
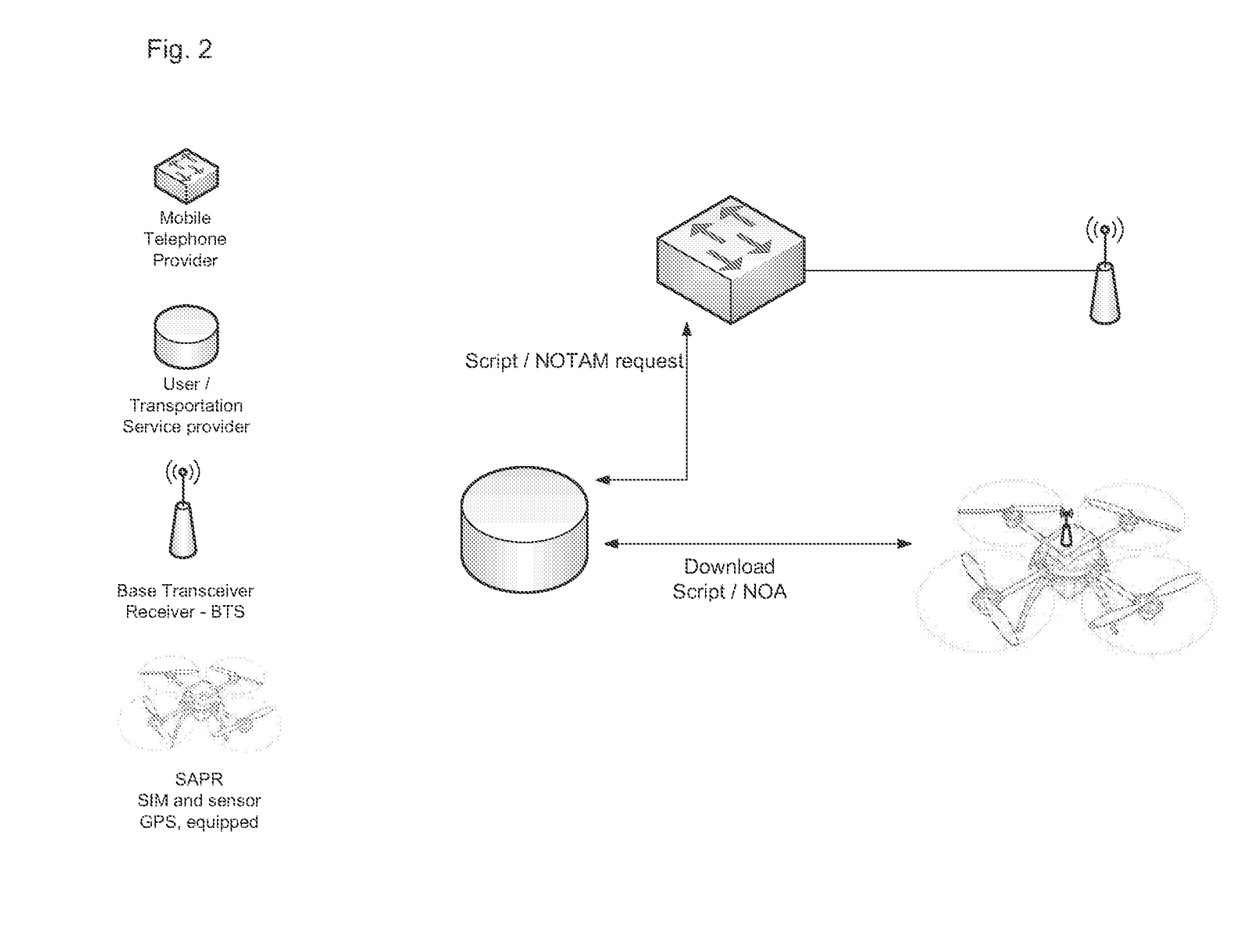
Figure 3:
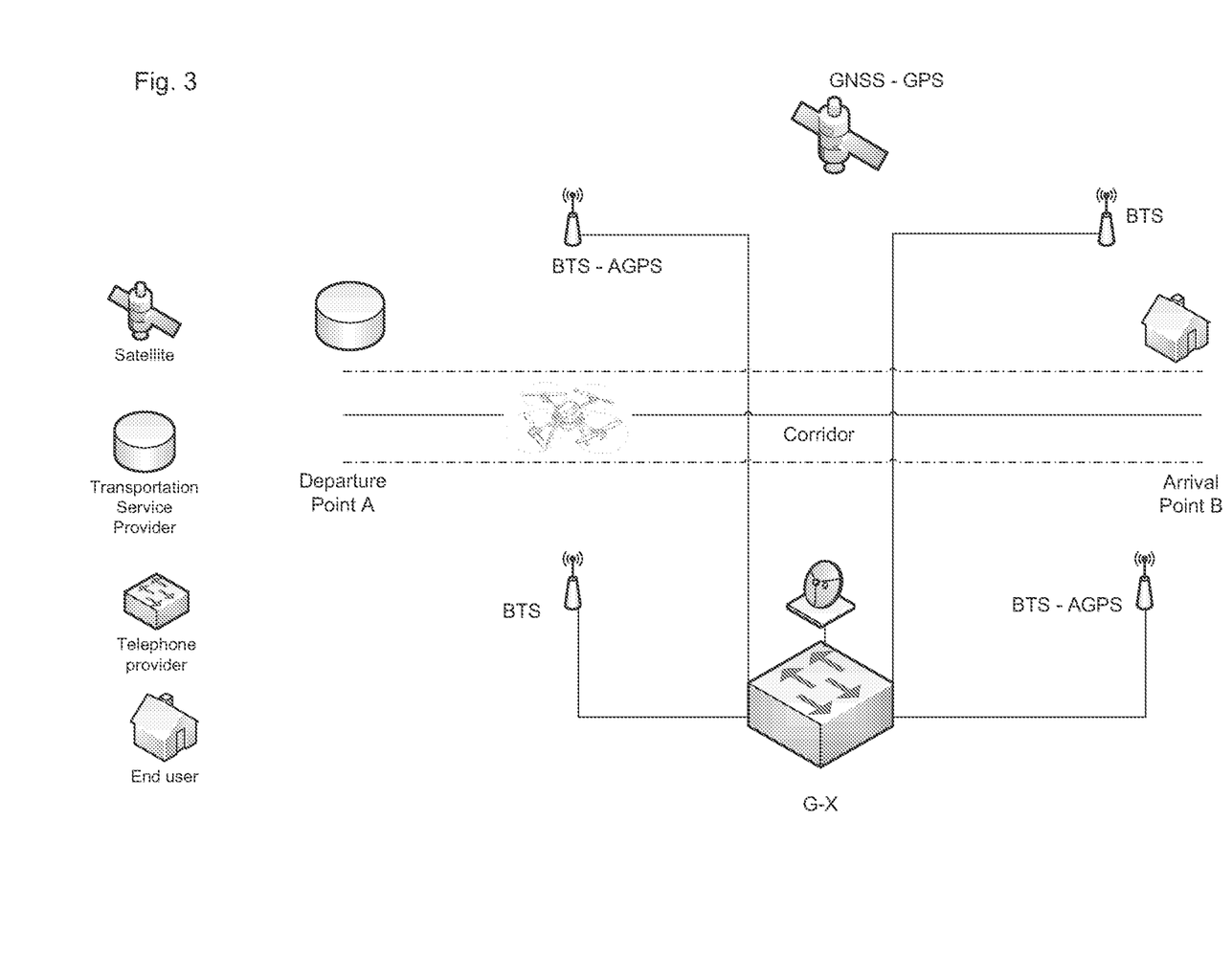

In light of the checks, the system accepts or offers alternatives. Following a confirmed bidirectional procedure between user and system it is generated a script/path program that is sent directly to the vehicle in question. With this information at the agreed time, the vehicle starts the mission toward the programmed destination, always according to the instructions contained inside the script, until the return to the starting point. The path of the vehicle during the various phases is verified in a continuous manner with the information exchanged on the two-way communication channel where, in addition to geographical and cruising data, pass the data relating to the height so that the centralized system is able to control on a monitor compliance with the corridors assigned to the vehicle in question and possibly drive the vehicle remotely and check at that time what are the vehicles that are running in contiguous and alternative flight plans. To accomplish this the existing technologies in the market appropriately coordinated by the applicant make it possible to carry out a planned and automated control of various vehicles. The use of mobile radio systems, such as telephone networks and data, are in the intention of the applicant particularly suitable. These networks, which are widely distributed throughout the national territory, fit conveniently on the type of service designed by the applicant. See in this sense one of the many books available on the network titled EASY LTE by Telecom Italia that shows about historio-graphical uses and characteristics of the first cellular networks up to modern LTE—Long Term Evolution, with particular reference to the technologies of positioning and LI—Lawful Interception. Each person skilled in the art will be immediately agree about the easiness to use, speed, economy and safety of the invention. FIG. 2 is a scheme of the relationship between the mobile telephone provider and a user equipped with a SAPR. FIG. 3 shows the general scenario full of macro systems acts to put into practice the various features of the claimed method. The various vehicles, as mentioned above, if not led by a single routing system may not be able to complete their mission or worse could cause accidents and damage to persons or things. Therefore, to do so, the vehicle like an airliner aircraft, must be equipped with a transponder, or equivalent system, which permits the central control body to instantly verify the location of the various aircraft, through a communication channel that allows to modify the flight plan provided according to contingent needs. To simplify, in a complex system such as that of air transport are provided some standards that are called in jargon, Rules of the Air that, make possible to the pilots and controllers, using the various instruments on board the aircraft, on ground and on the control tower, the takeoff, the travelling and landing of each aircraft. The applicant considers that all these functions can easily be adopted even in the case of SAPR by equipping this aircraft with simple equipment available in the market and in particular: a GPS system, cellular radio communication system with SIM or IMSI, speedometer, altimeter, anemometer, accelerometer/decelerometer, cruise system, with the option to manage automatically the system. Once the aircraft is ready to depart a cellular communication via TACS/GSM/UMTS/LTE (2G, 3G, 4G, 5G) is triggered and, in this way, in real time, sends to the control center the coordinates of its flight. Here the control center verifies and compares with the flight information of the mission that previously were been requested. In case of failure to comply with the plan assigned without having completed the mission, the controller via message interrupts the mission and determines the return of the aircraft to the base using the security corridor assigned for these cases. In the extreme cases in view of a possible system default of the aircraft, the same system shuts down automatically and triggers the opening of a safety parachute so that the owner of the aircraft with the latest communication received of the coordinates can proceed with the aircraft recovery. The idea of managing the system that was designed and is claimed utilizes the mobile radio networks in a different and innovative way, never thought before. As is well known the cellular networks, in addition to transport voice or data between a point and the other of the network or between two persons shall exchange an extreme quantity of signaling data, which serve to support the communication itself. Since the exchange of information can also be used in illegal situations, in this scenario, there is from the Authorities the need to have in place systems that allow the interception of such communications, following certain established rules. In this sense, see the procedures and the standards to which national states refer namely ETSI: TS 101 671 & ES 201 671, TS 101 331, TR 101 943, TS 102 232—1/2/3/4/5/6, TS 133 108. In this case, the systems developed for the interception can instantly collect in addition to recordings of conversation, who is calling, whoever is receiving, the nets where the aircraft is connected to and the geographical coordinates of where the information are collected or are generated. Therefore, in the case of a drone equipped with SIM card showing the codes, ICCID, IMSI, MSISDN and relative mobile telephone hardware showing the IMEI and MAC codes, you will have that certain information obtained by the tracing system and the other information received from the guidance system of the drone and sent to the mobile telephone provider, after an appropriate elaboration, result as an equivalent service of what a transponder provides during the flight operation. Then a system that allow you to compare this information with the flight plan or original journey, based on indications of the control entity, allows you to know what happens in the assigned flight paths, in real time. Therefore, by equipping each drone with a SIM card on board controlled by a mobile telephone provider, it will be possible to organize a system to prevent intrusions into the air spaces adjacent. Only devices that are so prepared are able to provide a guarantee of service that makes possible the commercial exploitation of the drones.

DETAILED DESCRIPTION

Figure 4:
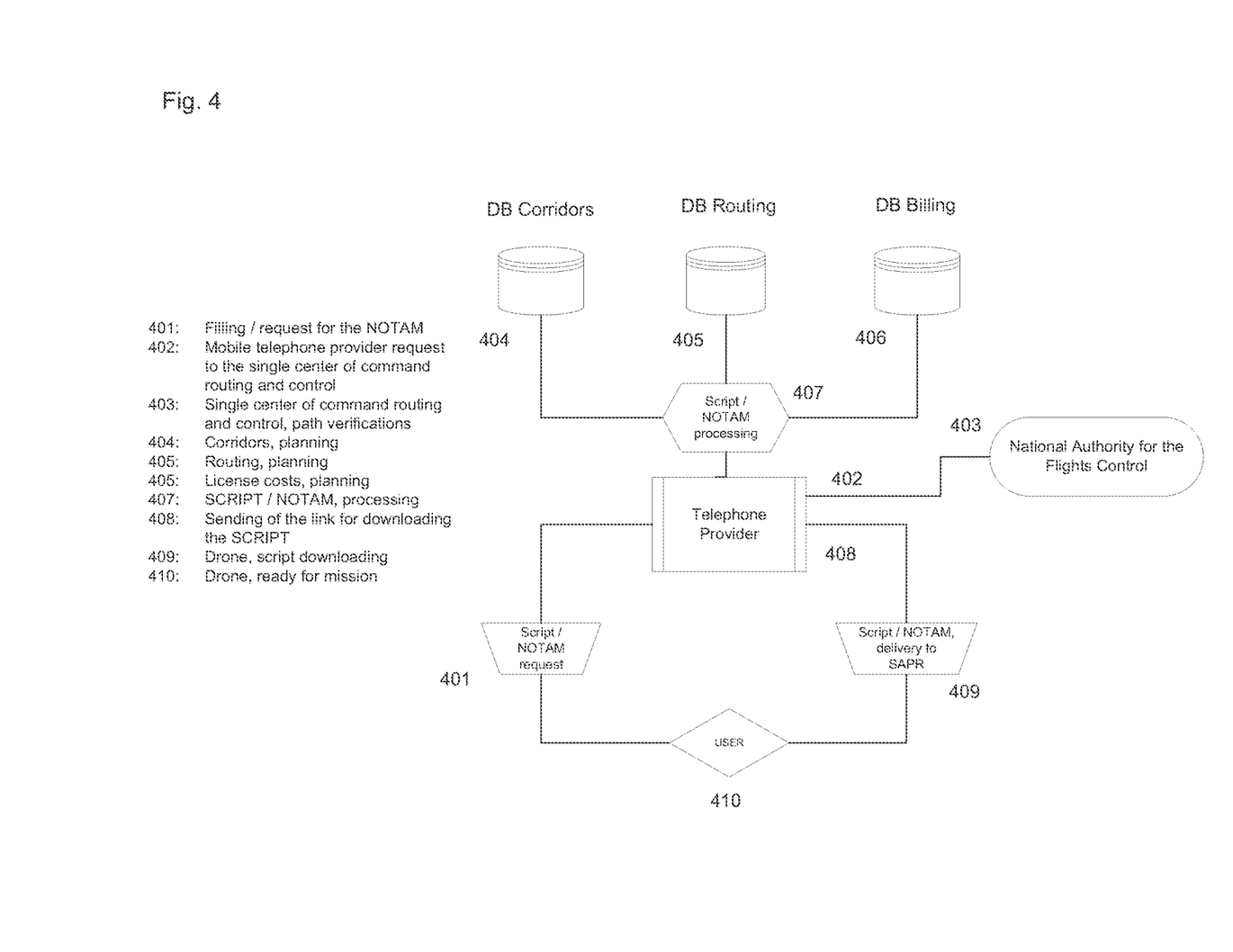
Figure 5:
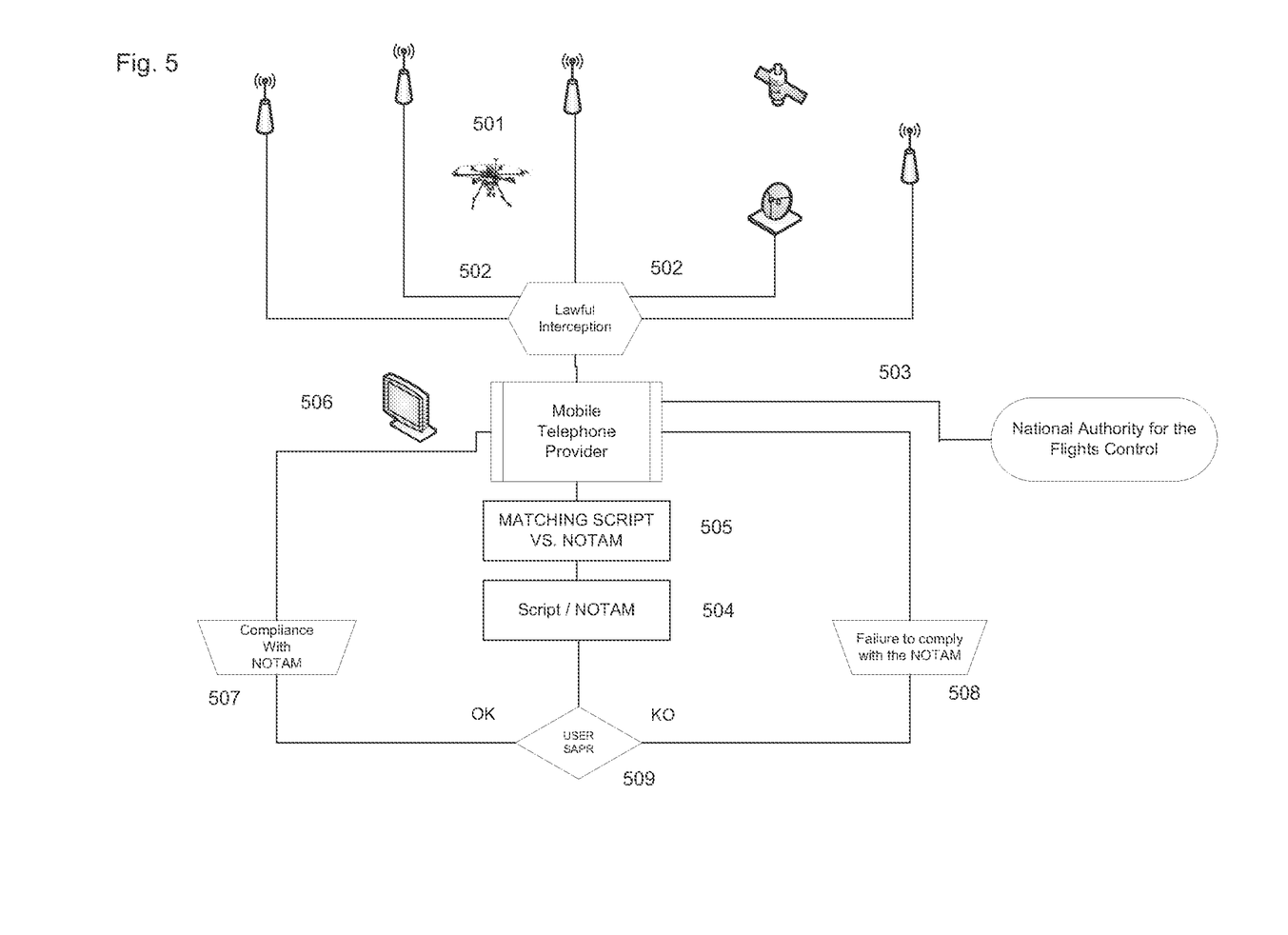
Figure 6:
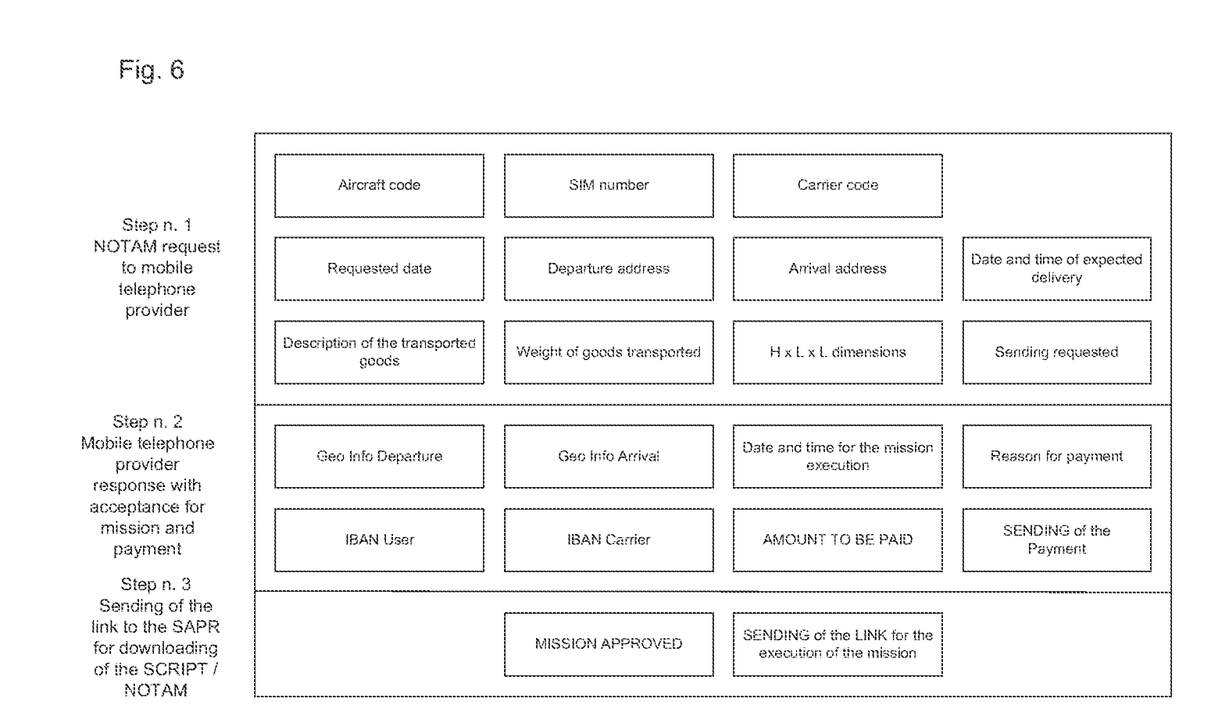
Figure 7:
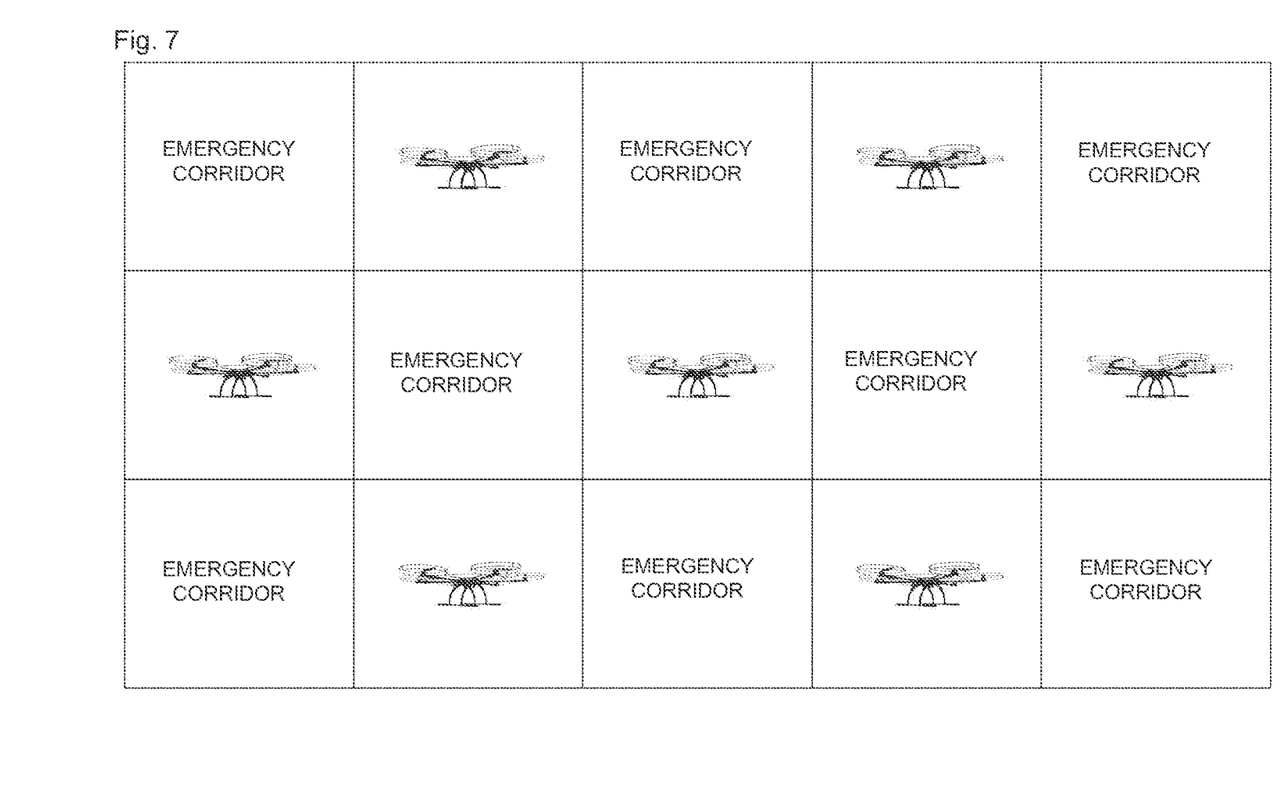
Figure 8:
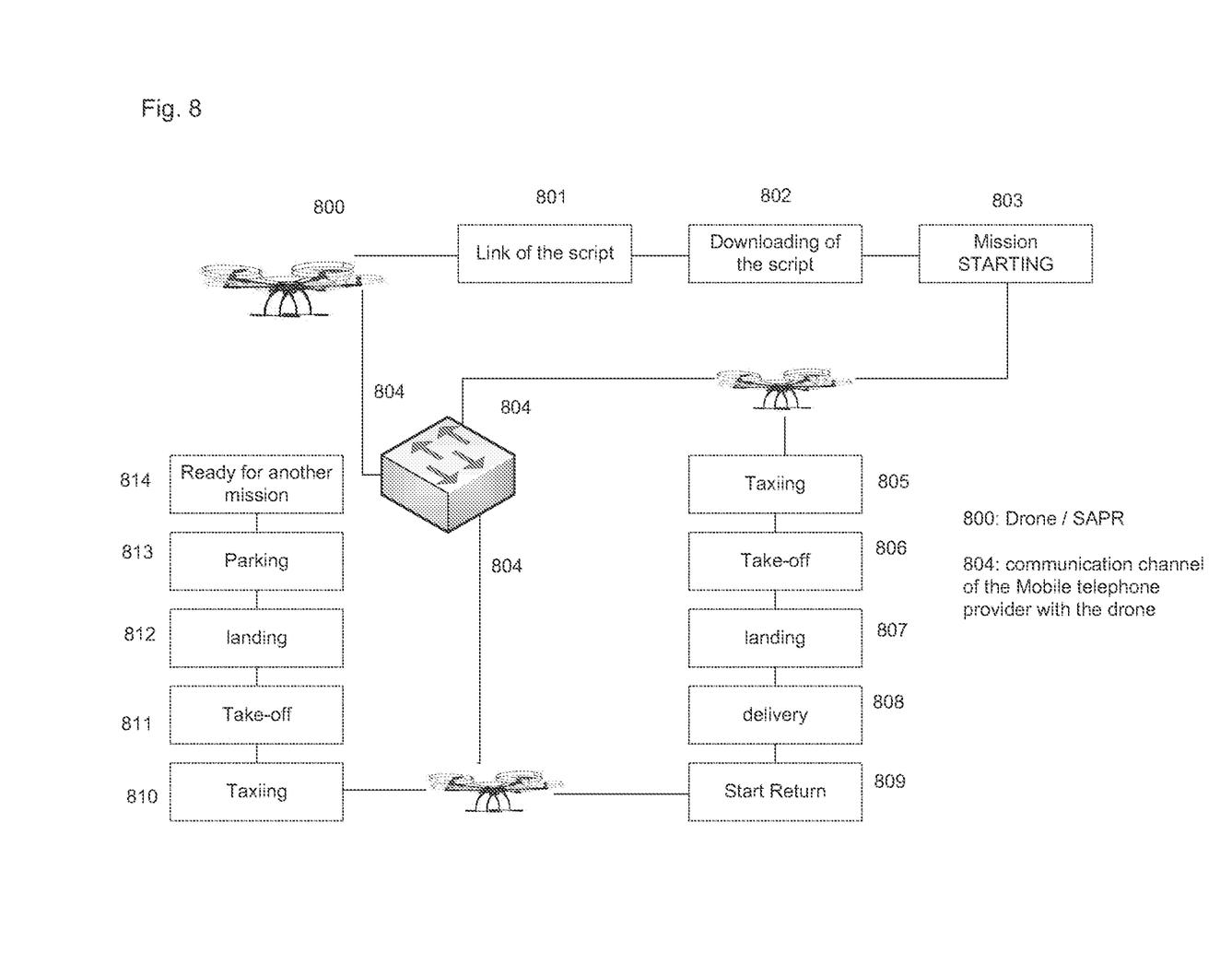
Figure 9:
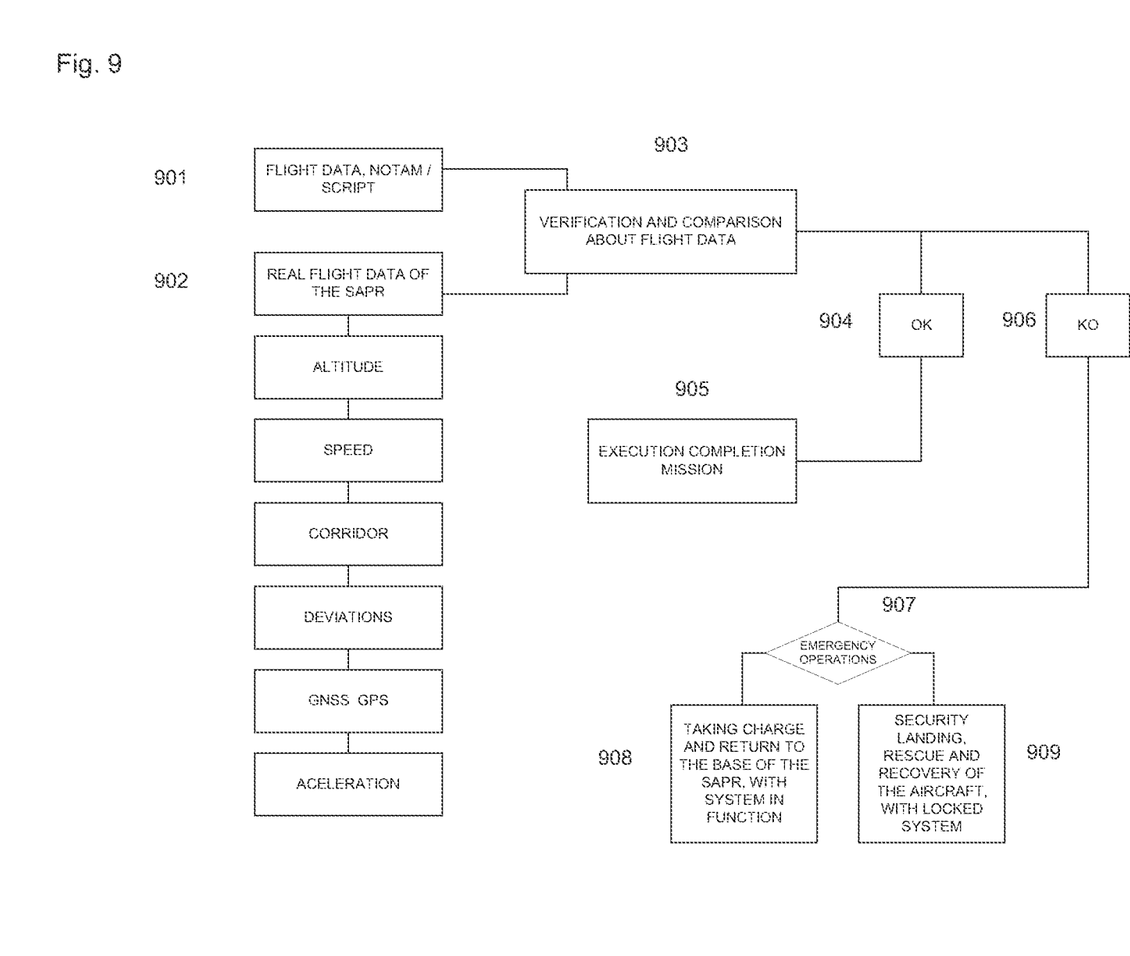
Figure 10:
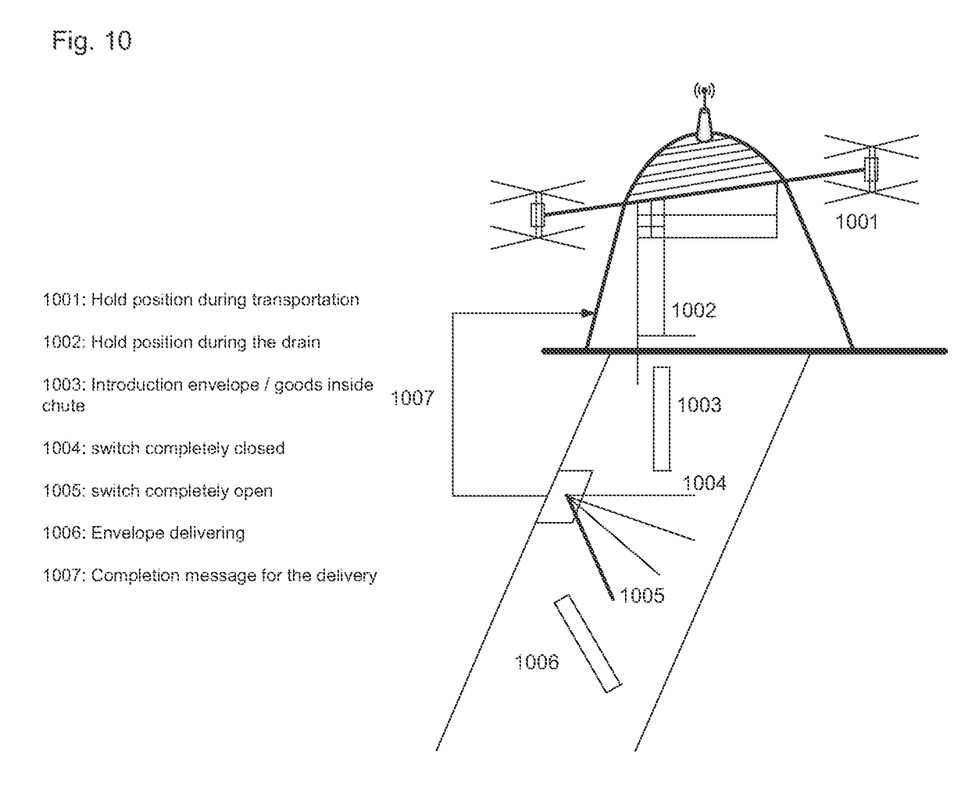

The description below is provided as way of example and is meant as preferred solution, understood the outset that any variations on the theme, have to be considered inside of the invention and within the scope of protection of the present patent application. The claimed system is herein described in main elements that allow to the person skilled in the art to appreciate the simplicity of use and the innovative nature of the invention. As you will see, arranging some very easy and known functions, the applicant is able to obtain the technological advances required with respect to the control and guidance from the remote vehicle; in particular, aircrafts denominated SAPR. The invention is inserted in a particular field that maintains special careful to the security. In Italy, in this case, exists an authority responsible for these matters, ENAC, that imposes the rules. Aircraft to which we refer are SAPR—Aircraft System Remotely Piloted. The SAPR or drones might it seem to the majority of the public as systems dedicated to fun activities such as aeromodelling, but, as it is easy to understand, this is not true due the rising demand for a commercial exploitation of these drones. In particular, through some so arranged fleets you can perform various commercial services starting from: collection to delivery of goods, the surveying, the surveillance, the aerial mapping, etc. Therefore, in effect, these small drones equipped with the same technical capabilities of an aircraft can be or represent a business opportunity that has to be subjected to the common Safe & Security rules, as for aircraft. The environment where the SAPR will have to operate is in fact a potentially risky environment for the third parties, especially when flying over populated areas or urban centers. To date these SAPR have reached a very high degree of sophistication that allows them to operate independently by activating all the control operations and tactical guidance, summarized through the acronyms S & A (Sense and Avoid) or S & D (Sense and Detect). The current rules that govern this type of aircrafts are divided into two main categories. The first, concerning the control systems in view that, in turn, can be divided into two further categories, namely VLOS (Visual line of sight) and EVLOS (extended visual line of sight) and the second, named BLOS (beyond line of sight) that relates to guidance systems and the instrumental control. In this case, these systems have to be respectful of the ICAO rules, established internationally. These rules are known as the Rules of the Air that are implemented, as in the case of the aircrafts, by a set of services on board and ground here later listed:

Distance Measuring Equipment (DME)
Global Positioning System (GPS)
Instrument Landing System (ILS)
Instrumental Meteorological Conditions (IMC)
Non-Directional Beacon (NDB)
Visual flight rules (VFR)
VHF omnidirectional range (VOR)
Visual Meteorological Conditions (VMC)
Radio assistance
Inertial guidance system All of these systems allow to the pilot and to the controllers to monitor continuously the aircraft ensuring the flight operations always safe. Only by the presence of these systems and rules has enabled the commercial development of the air travel. With this premise, cannot but agree that in order to promote commercial development of SAPR via BLOS systems you must make sure to maintain the same level of security provided to aircraft by adopting those technologies that allow one organized exploitation of the sky. In this case, the applicant considers that can be used conveniently other massively systems present on the market and commonly used that are able to fulfill all the obligations summarized with the term, Rules of the Air. As it is known in Italy there are currently over 100 million active SIM cards that are held and managed by 4 main telephone operators (so-called Full Operators, directly) and indirectly by 5, 6 MVNOs i.e. operators that, for their service provision, exploit the networks of the 4 major mobile telephone providers mentioned above. To manage a mass so huge of SIM it is required a powerful and sophisticated infrastructure. As it has known, the telephone companies in addition to the following services:

Voice Services
Data Service
Assistance provide to police forces and to the competent judiciary a set of services pursuant to Art. 96 of the Code of Communications, named, MANDATORY SERVICES. These real time performances allow the authorities to understand of any SIM card owner movement. In this case the mobile telephone providers helped by DGPS system in addition to know who is the caller, whoever is the receiver and eventually record the conversation or the transit data are capable of detailing with an accuracy of a few centimeters the user's movements over the territory. All these obligations shall be charged to the Mobile Telephone Provider and determine a set of performance, as seen, that consist in tracking, recording and control of particular users and are generally defined by the term LI—Lawful Interception. The mobile telephone providers thus have a constant contact with the user through the SIM, which has mounted on the smartphone of the latter. This means that you can count on a technological system that continuously has knowledge of the geographical position of the aircraft traced, via SIM on board and, in any case with the possibility of tracking the aircraft through the various mother codes of the mobile telephone hardware, IMEI and MAC. The technologies that oversee these apparatus allow the possibility that the telephone device be constantly in contact with the BTS—Base Transceiver Station—(Also: NB, NodeB, eNodeB) relatively the area where the equipment is located at that specific time and, if the GPS sensor of the device is activated, the mobile telephone provider, through systems named A-GPS and DGPS, is able to obtain the position of the apparatus in real time with a degree of accuracy in the order of a few tens of centimeters, putting in practice those services that in jargon are named LBS—Location Based Services. The mobile telephone providers can communicate and interact with all these terminals as if the latter were clients connected to their servers. This situation is comparable to the management of a control tower, which operates through the flight controllers executing the guidance and control operations. In fact, when these communications are properly managed, the mobile telephone providers can stably interact with their own terminals and execute appropriate remote operations consisting in the checking and tracking of all information exchanged. These features, are needed to safely ensure that increasing amounts of SAPR can hover in flight only after that have been assigned the overflight paths and the departure and arrival slots. In this case, all happens in the presence of a central entity that verifies compliance with the criteria of safety for the flight corridors assigned the SAPR aircraft. Therefore, in order to implement the service in question it is necessary that any SAPR operates having on board a control system based on one or more SIM. The installation on board of a SIM is therefore in itself guarantee of safety for the community, because in this manner these systems are not left to the free use of anyone but, as will be seen hereinafter are driven and controlled continuously in accordance, with the Rules of the Air. With this premise, we can understand that an infrastructure such as that available to the telephone companies can be conveniently used to provide supporting information the managing, routing and control in favor of SAPR systems. In FIG. 4 you can observe a block diagram that describes the services, per steps, which the service provider is called to meet with regard to the request, management, preparation and sending of the SCRIPT/NOTAM of guide and command addressed to the user, needed to perform its mission. The next, FIG. 5, identifies the equipment and the technical steps that the telephone company, in coordination helped by the E0, the national entity of control, uses to monitor the SAPR so prepared with the SCRIPT that contains map of the assigned corridors. Now therefore, starting from SAPR that are equipped with the following flight equipment:

Speedometer
Altimeter
Anemometer
Accelerometer
Barometer
Compass
Thermometer
Magnetic field, Measurer
Satellite sensor, GNSS, A-GPS
Proximity sensors, including for example, LIDAR, SONAR
Telemetry System
Inertial guidance system
Microphone
Speaker
One or more cameras
One or more slots for SIM card, same SIM, or equivalent hardware
Real time Control system of the flight script
Cruise system, driving and dynamic rearrangement, based on the flight plan
System Data Transmission
System voice transmission
Loading system with automatic weighing
Stationing and battery charging system Delivery system, with release system of the cartridge cases in case of use of a pneumatic mail systems Safety landing system, parachutes to increase the lift area, and/or a SRS airbag systems to cushion energy you have an aircraft, sophisticated and prepared to be used, that constantly and instantly interacts following the instructions received from the central system that sends the flight info and provides the relative routing. This is accomplished by checking regularly the flight plan in the corridor allocated and with the correspondence of the take-off operations, taxiing and landing of the SAPR with the assigned mission through NOTAM/script. To do so is provided a system as FIG. 6 wherein the users can refer to obtain dynamically through some prepared web pages the flight instructions that are generated and immediately or subsequently issued to the user. The above is achieved through a particular release/delivery method to the user of the command script that in turn has been prepared based on of previous commitments and occupancy of the flight corridors by other users with the same needs for their SAPR. The applicant has contrived a system whereby the user who desires to plan its flight requests to the mobile telephone provider or, the Central Control Body (E0) which oversee the management of airspace, must to fill out a web form with a list of info as follows: its SAPR code, the USIM code, the departure date, the starting point and the point of arrival, the estimated flight time for the roundtrip. The system checks the requested flight schedule and, if not, proposes alternatives that may be accepted. Once accepted the proposed flight schedule, the system calculates the cost that must be paid for the use of the corridor and once received the payment, the mobile telephone provider sends to the SAPR the script containing all the information needed to complete the mission. The script contains all the information needed to make sure that the mission is carried out in the manner and at the times agreed with the mobile telephone provider or the control entity ensuring in this way the exclusive use of the corridor and of the timing of use in compliance with the authorized flight program. In this case, see FIG. 7, it is clear the task which the system is called to appropriately manage i.e. the various transit mission corridors and, in case, the emergency lanes. As we will see in fact with FIG. 8, the script foresees the execution of the following steps: triggering, departure, take-off, taxiing, delivery and landing operations with the return operation to the base to complete the mission, while the next of FIG. 9 foresees an algorithm to manage the damages or the drawbacks. Where is not possible to manage these problems only with the S&A and in case of retard with the time script/schedule assigned, the system drives the SAPR by using an emergency lane to allow the return to the base, if the drone is in good operating conditions or, in case of loss of the aircraft, the system determines via telemetry the point at which the drone presumably is located so as to launch an alarm and then ensure recovery of the same. Both the driving system of the SAPR, either the mobile telephone provider or the Control Central Body are able to constantly verify the compliance of the flight program with the assigned corridors. In the requested case these latter will also be in condition to take control of the aircraft to guide the same SAPR by utilizing their emergency personnel. The trigger and the start of the mission is carried out autonomously, it is sufficient that the SAPR is switched on and ready to start the mission. All instructions contained in the script are sufficient to respect of the flight program. The script contains inside all the necessary info about the location, height, and speed, the point of departure and destination, the relative travel times, the management of the escape and safety routes. The on-board software is designed to do lift in flight exclusively the SAPR with mounted the certificate script by the mobile telephone provider. The LI system—Lawful interception available to the mobile telephone provider coordinated with the planning of flights by the Control entity and again with its routing program, downloaded inside SAPR in turn equipped with automatic systems S&A—Sense and Avoid, are together able to arrange an error-proof secure system, which can also be used in areas with an high incidence of human presence. The so devised system thus is able to avoid the overlap of paths of different vehicles. This is even more true in the case in which the corridors or paths assigned, were NOT occupied by drones without SIM on board but were only occupied from drones equipped with telephone hardware that, as is well known, can also be tracked only on the basis of the codes IMEI and/or the MAC. The system L.I. Lawful interception is in fact able to find by means of the incoming signaling from the BTS if the drone has or not has on board, a valid SIM card. Then in the presence of drones that signal these inconsistencies, the system can implement those actions aimed at discouraging the use of SAPR not in compliance. Therefore, the system having this operational capability is able natively to avoid any flying accident, by restricting and allowing to the air operations only those devices having valid SIM card on board. The Lawful interception system suitably programmed and planned is capable of handling thousands of flight operations until the saturation of the relative transit corridors, ensuring safe & security levels comparable to those insured for commercial aircraft operated by pilots on-board and, ground assisted from flight controllers. There is no real limitation, in fact, the modern lawful interception systems adopted by the mobile telephone providers are potentially able to track millions of SIM cards. These structures and associated technologies are more than sufficient to support the onerous task of monitoring SIM cards mounted on drones. In this case the same SIM cards are acting as a transponder/channel of communication between the SAPR and the mobile telephone provider. Therefore it is reconfirmed the importance of having a SIM card mounted on each drone and in any case, even in the absence of the same SIM, to have an hardware of cellular origin, that can be tracked, by making a cross reference with the other codes available on board, in this case, IMEI or MAC number. Therefore, the system is suitable to handle Fleets of drones that can be programmed to perform various tasks in particular the collection and delivery of goods such as small parcels, packages, envelopes, small objects. In this case, the drone in its classical shape lends itself to having a usable area for stowage of goods that can be transported. Given the present short autonomy of the batteries, which certainly should increase in the next future and given their low noise and environmental impact, it is believed that this type of power supply be the preferred solution. For that reason you can consider at least for now that the delivery missions will take place for individual destinations and not to multiple destinations. Hence, when the SAPR completed its mission and is returned to the base recharges the battery and uploads the drone with other goods for the next mission. As a preferred solution, the Fig. n. 10 shows the drone during the step of stationing at the logistics base or at the destination where the drone goes to put itself physically upon a stall. At logistic distribution base during the parking operation, the stall is used for recharge the battery or for its replacement and to load other goods to be delivered to the next destination. However at the destination the drone leans on a chute in which the goods are left to drop. In this case, the chute is arranged for the checking of the delivery operation. In this way that the SAPR who performed the mission receives a confirmation. After prior agreement between the service provider and the user are also performed the withdrawals of the goods at the same address where previously the delivery was performed. These operations are made taking always in account the date and time of collection, the weight, size, type and characteristics of the goods. The same goods will find housing inside of the tilted luggage compartment that is also capable to determine the weight to be transported. These means all are located at the bottom of the drone, so that the drone can operate always and only in appropriate weight conditions. Here below, as a further simplification and detail of use, the description of the service stages, from the transportation order required by the end user, to the execution of the mission until the completion of the same with the return and landing at the starting base, of the SAPR. An end user requires to its service provider the delivering to another end user of an envelope containing some documents, from a given location named (A) to a second location called (B) at a specified date and time (FIG. 3). The delivery by prior appointment of the Service Provider (U-X) with the recipient for receiving the envelope (FIG. 3/B point). The service provider (U-X) shall administer the order received by the end user and, fills in turn the request form on the web site of the Mobile Telephone Provider (G-X). In this phase, the service provider (U-X) completes the web form (FIG. 6—Phase 1), prepared by the Mobile Telephone Provider (G-X), by inserting the following data: the aircraft code, the SIM card number on board of the SAPR, the authorized carrier code, the date of execution of the service, the departing address, destination address, the description and weight of the goods transported and then sending the request to the Mobile Telephone Provider (G-X). The Mobile telephone provider (G-X) then forwards, in turn, the same request (FIG. 4/402) to the central control system (FIG. 4/403) also called (E0) that based on the data received verifies the availability of the corridors inside the Data Base (FIG. 4/404) and on the same Data Base the routing time allocated for the corridor (see FIG. 4/405). Once verified the feasibility of the mission, the centralized control system (E0) approves the mission and communicates it to the mobile telephone provider (G-X). The mobile telephone provider (G-X) at this point determines, after verification on the Billing DB (FIG. 4/406), the cost of having to charge to the transportation provider (U-X) and processes the script (FIG. 4/407) based of the following parameters: path geographic data from the starting point to the end point, date, starting time for the execution of the mission with the SAPR, the data to make the payment, IBAN of the beneficiary, the mobile telephone provider (G-X), the IBAN of the debtor, the transportation service provider (U-X), the amount due, the reason for payment (FIG. 6—phase 2). From the above, the transportation service provider (U-X) pays the telephone company (G-X) and after the payment outcome and the final controls about the flight plan data required, receive approval of the mission by receiving the link to download the script that has to be saved inside of the memory of the SAPR. The latter being identified with the vehicle code and corresponding SIM card number on board (FIG. 6 step 3). Connected via the mobile telephone provider to Internet the SAPR (FIG. 8/800) downloads the script (FIG. 8/801-802) that contains the necessary information for the delivery (FIG. 9/901) so as to be ready to perform its mission. The script inside contains the path data, the date and time, the recipient identification information including address and its SIM number or IMSI. In this way the SAPR is ready for the execution of the mission and (U-X). At its turn the transportation service provider loads the envelope to be delivered inside the hold. The SAPR also provides an automatic feedback of the size and weight of the envelope. At the appointed hour the SAPR departs for its destination with triggered installed and running, for the transmission and reception, the GPS antenna and the mobile telephone apparatus which send into the ether the real-time information of the SAPR location (FIG. 9/902). In this case the SAPR helped by its cruising system, instantaneously verifies (FIG. 9/903) correspondence and deviations between data contained in the script with real flight data. These latter are corresponding to: speed, height, acceleration, deceleration, path and the corridor assigned, tolerable deviations from the script data so as not to trigger the emergency operations (FIGS. 9/907-908-909). The above information, are so verified and elaborated by the lawful interception system (FIG. 5/502) of the mobile telephone provider (G-X) which supervises (FIG. 5/506) from the starting of the mission to the destination and to the next return of the SAPR to the base in the settled hours. In this case, the instantaneous position and altitude from the SAPR are compared, according control algorithms, with the data contained inside the script (FIG. 5/505-504). The mission then proceeds without particular further action within the corridor assigned while if the lawful interception system, occurred (FIG. 4/407) results outside the tolerances as defined by mobile telephone provider (G-X) it should proceed with an escalation of various operations of emergency (FIG. 9/908-909). In fact in case the mobile telephone provider (G-X) were to find, some deviations with respect to the parameters: speed, deceleration, acceleration, path, positioning, altitude, different from those predetermined and contained inside the script, would result an immediate action of the SAPR and of the mobile telephone provider (G-X) which, automatically and/or manually, would implement the most suitable emergency actions depending on the contingent situation encountered. Well in advance in the meantime the customer care of the transportation service provider, (U-X) can arrange an appointment by phone to agree with the recipient about the expected delivery schedule and about the meeting point. In addition, the customer care can provide the recipient a unique code of the mission that has to be communicated in turn to the SAPR by the recipient upon delivery of the envelope. The SAPR is therefore now programmed and ready with its flight plan, according the script, at the agreed point of delivery and at the times settled. The SAPR so (FIG. 8/803) lifts off and in compliance with the schedule moves towards the destination. The SAPR directly or the customer care of the service provider (U-X) can also send a reminder few minutes before the encounter to have a better planning of the resources. In case thus the mission has been confirmed, the SAPR approaches to the delivery point and it meets with the recipient. At the meeting point, the SAPR and the recipient's smartphone perform the mutual recognition operations through their telephone apparatuses. These latter are equipped with the most common transmission equipment, mounted on modern smartphones, i.e., NFC, RFID, Barcode, Bluetooth, Wi-Fi. The feedback/mutual recognition consists of the verification of the respective telephone numbers and/or the mission code. Once you recognized the recipient, the SAPR, leaning on to a so prepared stall (FIG. 10) or halfway in flight, opens its hold and it leaves glide to earth the envelope (FIG. 10/1002) and again (FIG. 8/808). The mutual recognition and typing of the unique code of the mission can be considered like a confirmation receipt for the execution of the mission. At this point, the SAPR closes its hold and departs (FIG. 8/809) in the direction of the operations center of the service provider (U-X), where at its arrival is going to lean on its parking area where the service provider (U-X) once he verified the conditions of the SAPR, the battery for example, prepares the SAPR for another mission.

EXPLANATION OF TERMS USED

AGPS Assisted GPS
Bluetooth Data transmission standard for wireless personal area networks
BTS Transmission and reception antenna for cellular networks
BLOS Beyond light of sight
DB Data Base/Data Storage
DGPS Differential GPS system
E0 Central control body, taken as an example
ENAC Italian civil aviation authority
ENAV National flight control agency
eNodeB BTS equivalent for LTE networks
EVLOS Extended Visual Line Of Sight
GPS Global positioning system
GNSS Global Navigation Satellite System
GSM Global System for mobile communication
G-X Mobile Telephone provider, taken as an example
IBAN International Bank Account Number
ICAO International civil aviation organization
ICCID Integrated circuit card identifier
IMEI International Mobile Equipment Identity
IMSI International Mobile Subscriber Identity
L.I. Lawful interception, tracking system and data collection based on telephone number, IMSI, IMEI
LBS Location Based Services
MAC Media Access Control
MSISDN Mobile subscriber ISDN number
MVNO Mobile Virtual Network Operator
NFC Near field communication
NodeB BTS equivalent for UMTS networks
NOTAM Notice to airmen/information, flight schedule, released by the Central control body to SAPR and to mobile telephone provider
QRcode Quick Response Code
RFiD Radio frequency Identification
SAPR Unmanned Aircraft System
SCRIPT Computer program
S & A Sense & avoid
S & D Sense & detect
SIM Subscriber identity module
SRS—Airbag Supplemental restraint system—Airbag
UMTS Universal Mobile Telecommunication System
USIM Universal Subscriber Identity Module
U-X Service transportation provider as taken in example
VLOS Visual light of sight
Vehicle Mechanical mean, locally or remotely human guided, in terrestrial or aeronautical field
Wi-Fi Wireless Fidelity, wireless internet
For these reasons, we expose the following claims
What is claimed is:

1. A method for controlling vehicles in real time, the method comprises:
    monitoring, by a central control system, a progress of a vehicle;
    determining, by the central control system and based on the monitoring, whether the vehicle follows a predefined flight path authorized by the central control system; and
    responding, by the central control system, to an outcome of the determining;
    wherein the monitoring comprises verifying a location of the vehicle;
    wherein the verifying comprises comparing the predefined flight path to vehicle location information obtained by the vehicle via a satellite positioning system and vehicle location information based at least in part on interactions of one or more mobile telephone service providers through telephone networks with the vehicle having onboard a cellular-type hardware or one or more onboard subscriber identify modules registered to the one or more mobile telephone service providers;
    wherein the one or more mobile telephone service providers determine the position of the vehicle by a location based service; and
    wherein the one or more mobile telephone service providers inform the central control system about the position of the vehicle.

2. The method according to claim 1 wherein the vehicle is an unmanned aircraft system, and wherein the vehicle location information is unmanned aircraft system location information.

3. The method according to claim 2, wherein the responding comprises instructing, by the central control system, the unmanned aircraft system to terminate a mission allocated to the unmanned aircraft system in case of a deviation, beyond a predefined tolerable deviation, of the unmanned aircraft system from the predefined flight path.

4. The method according to claim 2, wherein the responding comprises launching an alarm in case that the unmanned aircraft system is deemed to be lost.

5. The method according to claim 2, comprising:
    determining, by the central control system, a set of predefined paths to be followed within an aerial space controlled by the central control system; and
    enforcing, by the central control system, a plurality of unmanned aircraft systems travelling respectively within the predefined paths of the set.

6. The method according to claim 2, comprising maintaining, by the central control system, authorized missions information regarding predefined paths and timing of authorized missions.

7. The method according to claim 6 comprising:
    receiving a mission request to perform a mission, the mission request defines a departure location, a destination, and timing constraints for completing the mission;
    determining, based on the authorized mission information, whether the mission can be accomplished;
    approving the mission request when the mission can be accomplished; and
    rejecting the request or suggesting an alternative mission when the mission cannot be accomplished.

8. The method according to claim 6 wherein the monitoring comprises monitoring of speed, position, acceleration, deceleration of the unmanned aircraft system.

9. The method according to claim 2, wherein the verifying comprises receiving unmanned aircraft system information obtained during a lawful interception process.

10. The method according to claim 2, wherein the verifying comprises receiving unmanned aircraft system location information from location based services.

11. A method for performing a mission by an unmanned aircraft system, the method comprises:
    receiving, by the unmanned aircraft system, mission information regarding a mission to be executed by the unmanned aircraft system, wherein the mission information comprises (a) information about a cargo to be conveyed by the unmanned aircraft system, and (b) flight path information about a predefined flight path authorized by a central control system, wherein the flight path information comprises timing constraints;

retrieving the cargo;

performing the flight path while communicating with the central control system and with a mobile telephone service provider associated with the unmanned aircraft system, wherein the communicating comprises transmitting unmanned aircraft system location information; and terminating the mission when instructed to do so by the central control system;

wherein the step of performing the flight path comprises
monitoring, by the central control system, a progress of the unmanned aircraft system, wherein the monitoring comprises verifying a location of the unmanned aircraft system, and determining, by the central control system and based on the monitoring, whether the unmanned aircraft system follows the predefined flight path authorized by the central control system;

wherein the verifying comprises comparing the predefined flight path to location information obtained by the unmanned aircraft system via a satellite positioning system and location information based at least in part on interactions of one or more mobile telephone service providers through telephone networks with the unmanned aircraft system having onboard a cellular-type hardware or one or more subscriber identify modules registered to the one or more mobile telephone service providers;

wherein the one or more mobile telephone service providers determine the position of the unmanned aircraft system by a location based service; and wherein the one or more telephone service providers inform the central control system about the position of the unmanned aircraft system.

12. The method according to claim 11 wherein the mission information comprises information describing an emergency corridor for use as needed for emergency or security operations.

13. The method according to claim 11 comprising determining not to upload the cargo when a weight of the cargo exceeds a predefined weight.

14. The method according to claim 11 comprising opening a parachute and shutting down the unmanned aircraft system in case of an extreme failure.

15. A central control system comprises computers and communication units that are configured to:

monitor progress of a vehicle;

determine, based on an outcome of the monitoring, whether the vehicle follows a predefined flight path authorized by the central control system; and respond to an outcome of the determining;

wherein the monitoring comprises verifying a location of the vehicle;

wherein the verifying comprises comparing the predefined flight path to vehicle location information obtained by the vehicle via a satellite positioning system and vehicle location information based at least in part on interactions of one or more mobile telephone service providers through telephone networks with the vehicle having onboard a cellular-type hardware or one or more onboard subscriber identify modules registered to the one or more mobile telephone service providers;

wherein the one or more mobile telephone service providers determine the position of the vehicle by a location based service; and wherein the one or more mobile telephone service providers inform the central control system about the position of the vehicle.

16. The central control system according to claim 15 wherein the vehicle is an unmanned aircraft system, and wherein the vehicle location information is unmanned aircraft system location information.

17. The central control system according to claim 15, wherein the central control system is configured to launch an alarm in case that the unmanned aircraft system is deemed to be lost.

18. The method according to claim 1, wherein the subscriber identity module stores one or more of: an ICCID code; an IMSI code; and a MSISDN code.

19. The method according to claim 1, wherein the cellular-type hardware stores one or more of: an IMEI code; and a MAC code.

20. The method according to claim 1, wherein:

tracking services of the vehicle are made via one or more of: lawful interception services; and location-based services, and the tracking services are based on one or more of: ICCID; IMSI; MSISDN; IMEI; and MAC codes.

21. The method according to claim 2, further comprising providing intrusion alerts from the unmanned aircraft system, wherein an intrusion alert indicates an intrusion in a corridor allocated to another unmanned aircraft system.

22. The method according to claim 2, wherein the unmanned aircraft system is equipped with an automatic unloading apparatus for the execution of delivery, and wherein the automatic unloading apparatus is activated after identification of the addressee.

23. The method according to claim 22, wherein the unmanned aircraft system recognizes the addresses by some unique information regarding the path and comprising one or more of: MSISDN Number; CRO number; Digital Code; and ID.

* * * * *